United States Patent [19]

Eastman et al.

[11] Patent Number: 4,560,862
[45] Date of Patent: Dec. 24, 1985

[54] SYSTEM FOR OPTICAL SCANNING OVER A LARGE DEPTH OF FIELD

[75] Inventors: Jay M. Eastman, Pittsford; John A. Boles, Rochester, both of N.Y.

[73] Assignee: Skan-A-Matic Corp., Elbridge, N.Y.

[21] Appl. No.: 488,885

[22] Filed: Apr. 26, 1983

[51] Int. Cl.⁴ .............................................. G06K 7/10
[52] U.S. Cl. ................... 235/467; 235/462; 235/472; 350/6.8
[58] Field of Search .................. 235/467, 472, 462; 350/6.8

[56]  References Cited

U.S. PATENT DOCUMENTS

| 3,978,317 | 8/1976 | Yamaguchi et al. | |
| 4,019,026 | 4/1977 | Nakanishi et al. | 235/467 |
| 4,199,219 | 4/1980 | Suzki et al. | 350/6.8 X |
| 4,335,302 | 6/1982 | Robillard | 235/462 |
| 4,357,071 | 11/1982 | Mankel et al. | 350/6.8 |
| 4,488,678 | 12/1984 | Hara et al. | 235/462 X |

Primary Examiner—David L. Trafton
Attorney, Agent, or Firm—M. LuKacher

[57] ABSTRACT

A system for optically scanning objects, particularly bar codes over a large depth of field, uses a incandescent light source to illuminate the bar code and scans the field using a rotating polygon having mirrors with different curvature on different facets thereof which provides scanning in different focal planes in the field while temporally multiplexing these planes. The optical, electronic and mechanical components are modularly packaged on a printed circuit board adapted to be contained in a housing which may be held near and pointed at the code when it is desired to read the code.

23 Claims, 3 Drawing Figures

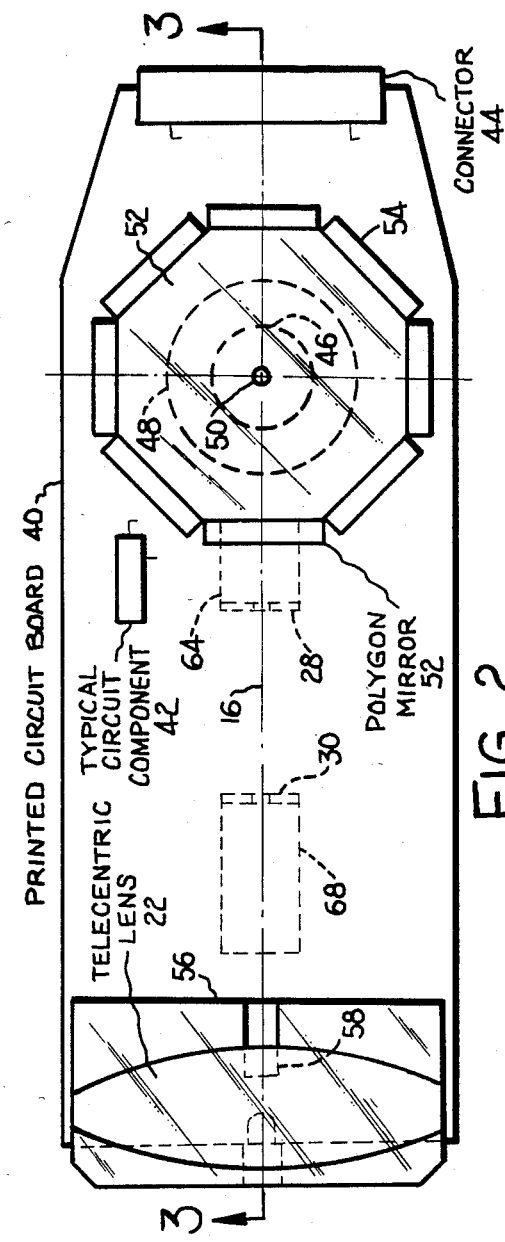
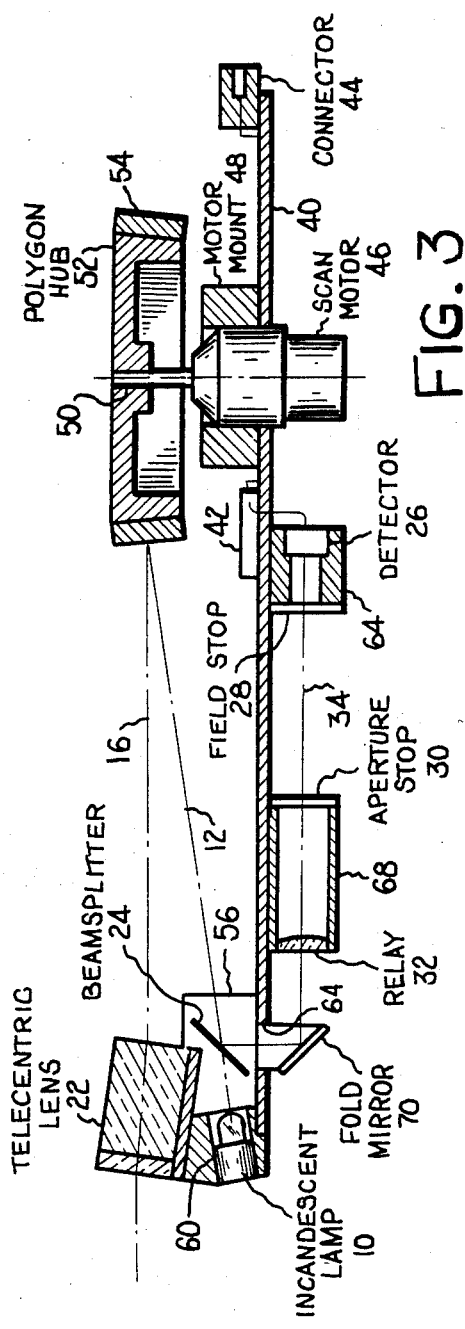

SYSTEM FOR OPTICAL SCANNING OVER A LARGE DEPTH OF FIELD

DESCRIPTION

This invention relates to optical scanning systems and particularly to scanning apparatus having a scanning range including a large depth of field.

The invention is especially suitable for use in a bar code scanner for reading the bar codes of the type usually found on consumer products, for example, the uniform grocery product or UPC code, and particularly to provide a bar code scanner which may be hand held.

Bar code scanners, which are generally available, use a source of coherent light from a laser and scan the light in various directions across a window on which the object having the code is placed. Because the laser illumination is intense and the aperture stop is small or F number (F/#) is large, the scanner is not sensitive so far as depth of field is concerned and the bar code may be located over a large distance of several inches forwardly of the window. The bar code signal is obtained by a photodetector which is responsive to light scattered from the bar code as the laser beam scans across the code. An example of a laser bar code scanner may be had by reference to U.S. Pat. No. 3,978,317 issued Aug. 31, 1976.

The use of lasers in bar code scanners is disadvantageous because of their expense and also because intense laser light is regarded as a health hazard. For example, laser devices must be registered with the U.S. Bureau of Radiological Health in the United States of America. Accordingly, it is desirable to utilize non-coherent light from conventional lamps in optical scanners, and a scanner using a non-coherent light source has been suggested (see U.S. Pat. No. 4,335,302 issued June 15, 1982).

The illumination of the code with non-coherent light is not as intense as with laser light. Moreover, in order to be practical for commercial use the scanner must be able to read codes located over a wide depth of field in front of the scanner as well as be tolerant of tilt and skew within the depth of field. As the bar codes become smaller, high resolution capability is essential in the code reader. When a small aperture stop is used in the optical system of the reader corresponding to a large F/# in order to get a large depth of field (sometimes referred to as depth of focus), the system is limited by noise when non-coherent or white light is used. The noise characteristics are constant and depend upon the noise generated in the photodetection process, to a large extent. Thus when the F/# is high, the intensity of illumination on the photodetector is reduced. The system is then signal to noise limited and incapable of resolving fine or high density bar codes. The problem is still further exacerbated when it is desired to use a non-coherent light source in a hand held scanner. The intensity of illumination from small sources such as incandescent lamps is quite low. By driving the scanner to use still higher F/#s in its optical system in order to obtain the necessary depth of field for code reading, for example, within a 2 or 3 inch range in front of the scanner, signal to noise is reduced below a tolerable level.

Accordingly, it is a principal object of the present invention to provide an improved system for optically scanning over a large depth of field.

It is a further object of the invention to provide an improved optical scanner capable of reading bar codes with high resolution even though non-coherent or white light is used as the source of illumination of the code.

It is a still further object of the present invention to provide an improved hand held scanner having a large depth of field.

It is a still further object of the present invention to provide an improved scanner for bar codes and the like which uses a non-coherent light source which may be an incandescent lamp and which is suitable for reading fine or high density bar codes.

It is a still further object of the present invention to provide an improved optical scanner which may be used for reading bar codes and which is of modular construction so as to facilitate manufacture and repair.

It is a still further object of the invention to provide an optical scanner, which is small enough to be hand held, and which is capable of high resolution scanning of objects, such as fine or high density bar codes at high scanning speed, such that a bar code can be read in a short period of time, say less than a second.

It is a still further object of the present invention to provide improved optical scanning apparatus, wherein the problem of requiring large F/# in order to obtain large depth of field-when limited by illumination intensity provided by a non-coherent light source which may be of small size and noise in the electronics which generates the bar code signal, is resolved in a cost-effective manner.

Briefly described, optical scanning apparatus embodying the invention provides a scanning range with a large depth of field through the use of optical means for providing a plurality of focal planes spaced from each other to define the depth of field. Means are provided for scanning a beam of illumination across the focal planes and for multiplexing the focal planes to obtain output signals corresponding to the object, such as a bar code which is scanned. Scanning and multiplexing are both obtained by the use of a rotatable optical polygon having a plurality of facets, each being a mirror of different curvature. The mirror may be illuminated by non-coherent light from an incandescent lamp over an optical transmission system of low F/# so as to maximize the intensity of illumination which is scanned across the focal planes. The optical system for receiving light from the object which is scanned has a much higher F/# so as to provide large depth of field about each focal plane. These depths of field overlap so as to provide the large depth of field over the scanning range of the apparatus.

The foregoing and other objects, features and advantages of the invention, as well as a presently preferred embodiment thereof, will become more apparent from a reading of the following description in connection with the accompanying drawings in which:

FIG. 2 is a plan view showing internal components of a hand held optical scanner embodying the invention;

FIG. 3 is a sectional view of the scanner shown in FIG. 2, the section being taken along the line 3—3 in FIG. 2.

Figure 1:
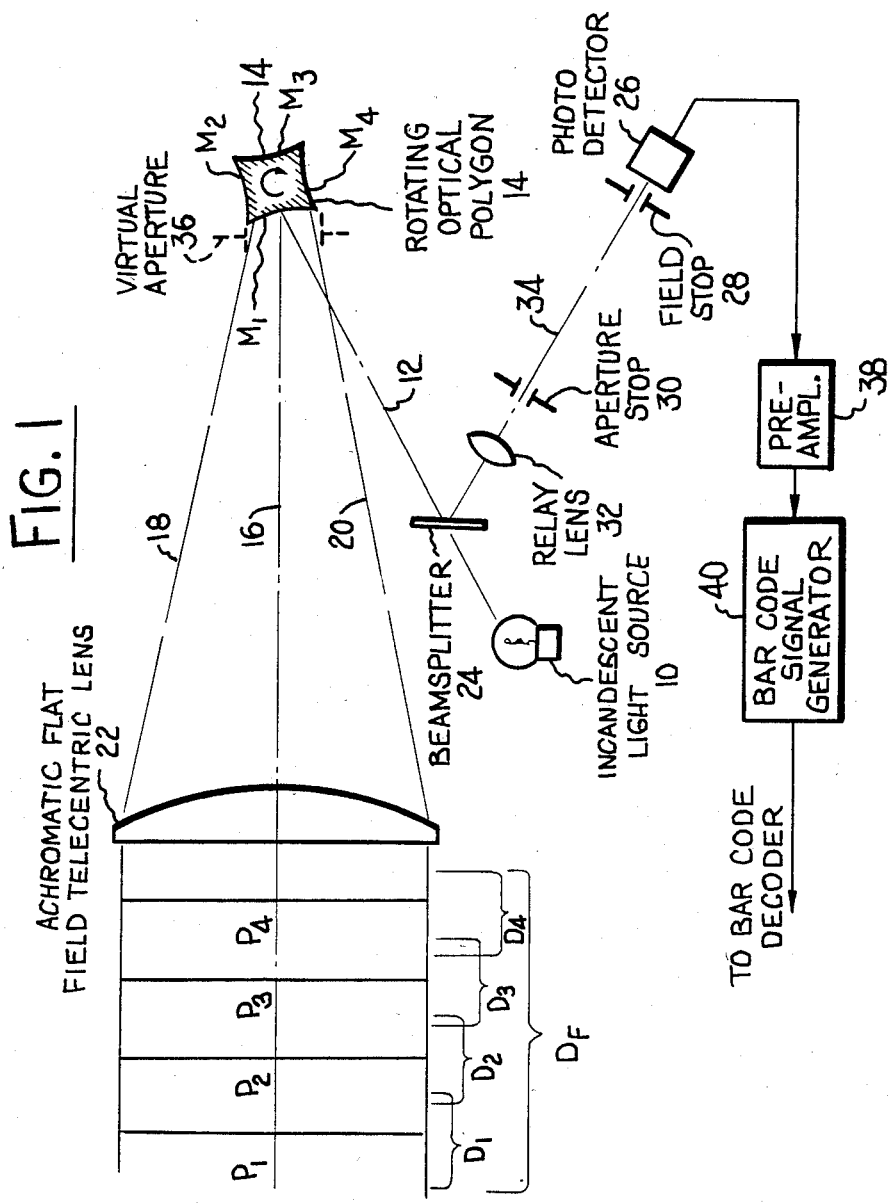
FIG. 1 is a diagram schematically illustrating an optical scanning system embodying the invention.

Referring to FIG. 1, there is shown a light source, which preferably is an incandescent prefocused lamp 10. Light from the source 10 is projected along a path 12 to fill a facet of a rotating optical polygon 14. The rotating polygon is illustratively shown as having four facets each with a mirror, $M_1$, $M_2$, $M_3$ and $M_4$ of different spherical curvature. As each mirror facet rotates, it reflects the beam from the source 10 forwardly along an optical path 14. Because the mirrors are on the surface of a polygon, the point of scan strictly speaking, is a region around where the paths 12 and 14 intersect. The mirrors scan the beam laterally in a fan, the edges of which are shown at 18 and 20. The mirrors $M_1$ through $M_4$ have different curvatures (their radii of curvature is different) so as to define four corresponding focal planes $P_1$, $P_2$, $P_3$ and $P_4$.

An achromatic, flat field, telecentric lens 22 collimates the beam to provide a collimated scan. The telecentric lens has its focus approximately at the point of scan. Thus, the light from the incandescent source 10 is prefocused to essentially fill the mirror facets of the polygon as they rotate to produce the scans in the four focal planes $P_1$ through $P_4$. These focal planes are desirably spaced at equal distances from the front surface of the lens 22, and in a practical system may be $\frac{1}{2}$ inch apart. As will be explained more fully hereinafter, the depths of focus about each plane $D_1$, $D_2$, $D_3$ and $D_4$ overlap to provide a large depth of focus (DF) as shown in FIG. 1.

The achromatic, flat field, telecentric lens is an important feature of the invention since it avoids any curved planes of focus which effectively loses depth of field when scanning bar codes; the codes usually lying on a flat surface. The achromatic characteristic of the lens 22 avoids displacement of different code images for different wavelengths of light when white light from the incandescent source 10 is used. Thus the achromat lens 22 assures that there will be but one image, rather than several images, for example, spaced blue and red images due to chromatic aberration. While filter may be used to overcome the affects of chromatic aberration upon detection of the light from the bar code, such a filter would attenuate the light and reduce the signal to noise ratio of the system.

The object within the depth of focus is scanned in a parallel fashion and the light reflected passes through the lens 22 along the path 16 and is reflected from the mirror (which is in play on the optical polygon 14) along the path 12 to a beam splitter 24. A receiving system including a photodetector 26, a field stop 28, an aperture stop 30 and a relay lens 32 are disposed along an optical path 34 between the beam splitter and the photodetector. The field stop 28 and aperture stop 30 are slits essentially parallel to the axis of rotation of the polygon. Bar codes pass, one bar or space at a time, through the field stop which is approximately the width of the narrowest bar or space in the code. The aperture stop controls the F/# of the receiving system and its size is a tradeoff between the depth of field and the desired signal to noise ratio. It is selected so that the depths of field $D_1$, $D_2$, $D_3$ and $D_4$ overlap so as to provide a wide depth of field, for example, 2 inches in front of the lens 22.

The F/# determines the amount of light which reaches the photodetector 26. Suitably the F/# may be approximately from 30 to 50 in the receiving system. While the F/# of the transmitting system from the incandescent lamp 10 to the field which is scanned may be between 2 and 3. This is because the lens 22 has a high F/#, for example, between F/1.6 and F/2 and because the light from the source 10 essentially fills the facets of the reflecting mirrors of the multifaceted polygon 14. Accordingly, the intensity of illumination on the object being scanned is maximized, while the depth of field and signal to noise of the receiving system is also maximized so as to enable the resolution of fine, dense bar codes.

The relay lens 32 provides a virtual image of the aperture stop immediately adjacent to the rotating mirror facets. This virtual aperture stop 36 provides the important feature of equalizing the F/# for each focal plane $P_1$ to $P_4$. In fact, the F/# of the system remains the same over the entire depth of field. The signal level of the reflected or scattered light which is produced by the photodetector from the illumination incident thereon is invariant to the location of the object within the depth of field. This facilitates high resolution of the bar code upon reading.

The relay lens 10 is desirably an antireflective coded spherical lens. The photodetector may suitably be a photodiode. The beam splitter 24 may be a 50% beam splitter provided by a partially reflective mirror.

The output of the photodetector is an electrical signal from which a bar code signal is generated. The electrical signal is preamplified in a preamplifier 38. A bar code signal generator 40 translates the signal from the preamplifier into a variable width pulse train corresponding to the bar code which is being scanned. The bar code signal generator may utilize two series connected differentiator circuits. The output of the first differentiator is used to obtain a degree of noise immunity and may be applied to comparators to set thresholds which the level of the signal from the second differentiator must exceed before being regarded as valid. The output of the second differentiator indicates by its zero crossings the location of the edges or transitions between the white and dark areas of the code. These edges, whether white to dark or dark to white, may be determined by their polarity and used to set and reset a flip-flop so as to provide the pulse train of variable width corresponding to the scanned bar code. This pulse train may be translated to a requisite level for use in digital logic for decoding the bar code. Such decoding logic is conventional and is therefore not described in detail herein. The preamplifier and bar code signal generator may be part of the scanner which is connected to the decoding logic which may be part of the computer system with which the scanner is used.

Referring to next to FIGS. 2 and 3, there is shown a module which contains all of the optical, mechanical and electronics components for a hand held scanner of the type described in connection with FIG. 1. These components may be contained in a housing, for example, in the shape of a gun with a trigger to initiate a scan when the object being scanned is positioned within the depth of field in front of the scanner.

All of the components are mounted on a printed circuit board 40. This board has printed wiring (not shown). Electronic components of the preamplifier 8 and generator 40, a typical one of which 42 is shown, are mounted on the board and connected to the printed wiring thereon. A connector 44 is also mounted on the board at the end thereof opposite to its scanning end. Another connector (not shown) may be inserted into the connector 44 to carry operating power to the scanner and its circuits and to obtain the bar code signals for application to a decoder which may separately be contained in a computer.

A scan motor 46 is mounted in a motor mount 48 on the board 40. The shaft 50 of this motor 46 supports and rotates the hub 52 of the optical polygon. This hub is desirably made of lightweight material, such as cast plastic. The optical polygon is an octagon, having eight sides and eight facets. Eight polygon mirrors 54 are attached, as by cementing to the eight faces of the polygon hub 52. These mirrors 54 may have two or more different curvatures. In the case of 4 mirrors, the mirrors with the same curvature (vig., the same radius) are diametrically opposed on the polygon.

A mounting block 56 is attached to the scanning end of the board 40. This block has a slot 58 therein in which the beam splitter 24 is mounted. A hole 60 in the block 56 mounts the incandescent, prefocused lamp 10. The telecentric lens 22 is disposed on a resilient mounting plate 62 on the block 56. The telecentric lens 22 illustrated in FIGS. 2 and 3 is a plano-convex lens in the form of a cemented doublet.

The photodetector 26 is disposed in a mounting block 64 on the underside of the board 40. The detector is connected to the printed wiring on the board 40. The field stop slit 28 is mounted at the forward end of the detector mounting block 64. Another block 68 having a bore therethrough mounts the relay lens 32 and the aperture stop slit 30 at opposite ends thereof. A fold mirror 70 directs the light into the receiving system along the optical path 34 through an opening 64 in the board 40.

The motor may rotate at relatively high speed so as to provide an effective scanning rate of about 100 inches per second. It is a feature of this invention to enable fast scanning rates to be used, thereby to obtain a reading of a code very quickly, say within half a second. The optical arrangement which provides for high F/# in the receiving system with relatively low F/# in the transmission system enables sufficient intensity of illumination to derive signals reflected from fine or dense bar codes, i.e., that is to resolve such codes, even though a small incandescent lamp is used as a light source and even though a large depth of field is provided.

The lens 22 and mirrors 54 are tipped so that reflections from the rear surface of the lens 22 which faces the mirrors do not go back down to the detector 26. Alternatively, the polygon may be lowered while the telecentric lens 22 axis is perpendicular to the board so as to preclude such reflections (glints) from being incident on the detector 26.

From the foregoing description it will be apparent that there has been provided an improved optical scanning system which is especially adapted to be incorporated into a hand held bar code scanner. Variations and modifications of the herein described system, within the scope of the invention, will undoubtedly suggest themselves to those skilled in the art. For example, a high intensity light emitting diode may be used instead of an incandescent lamp. Accordingly, the foregoing description should be taken as illustrative and not in a limiting sense.

We claim:

1. Scanning apparatus having a scanning range with a large depth of field which comprises optical means for providing a plurality of focal planes spaced from each other to define said depth of field, means for scanning a beam of illumination across said focal planes, and means for successively multiplexing said focal planes one at a time.

2. Scanning apparatus according to claim 1 wherein said multiplexing means includes means for temporally multiplexing said focal planes to provide different ones of said focal planes at different times.

3. Scanning apparatus according to claim 2 wherein said scanning and temporally multiplexing means comprises a rotatable optical polygon having a plurality of facets each being a mirror of different curvature.

4. Scanning apparatus according to claim 3 further comprising a source of light illuminating said mirror facets of said polygon and a detector responsive to illumination in said scanning range reflected from said mirror facets, and means for providing a much higher F/# in the optical path to said detector than in the optical path to said source.

5. Scanning apparatus according to claim 4 wherein said source is a source of non-coherent light.

6. Scanning apparatus according to claim 5 wherein said source is an incandescent light source projected on said facets to illuminate each facet surface substantially entirely.

7. Scanning apparatus according to claim 3 wherein said source produces non-coherent light and is disposed in illuminating relationship with said facets, a photodetector, means for detecting light from said range which is reflected from said facets along an optical path incident on said detector, aperture stop means in said path to produce a high F/# in the optical path from said range for light which is incident upon said detector whereby to enhance the depth of field about each of said planes.

8. Scanning apparatus according to claim 7 wherein said aperture stop means includes an aperture stop and means for providing a virtual image of said aperture stop adjacent to the reflecting surfaces of said mirror facets facing said range to produce the same F/# in the optical path to said detector from each of said focal planes whereby to equalize the intensity of illumination incident upon said detector which is reflected or scattered by an object in said depth of field.

9. Scanning apparatus according to claim 8 wherein a beam splitter is disposed in the optical path from said source to said mirror facets, the optical path from said detector to said facets extending from said detector to said beam splitter and from said beam splitter to said facets, said aperture stop being disposed between said beam splitter and said detector, and said imaging means being a relay lens between said aperture stop and said beam splitter.

10. Scanning apparatus according to claim 9 further comprising a field stop between said aperture stop and said detector.

11. Scanning apparatus according to claim 10 wherein said stops are slits aligned parallel with the axis of rotation of said polygon.

12. Scanning apparatus according to claim 3 further comprising lens means for collimating the light reflected from said facets and projecting said reflected light into said range.

13. Scanning apparatus according to claim 12 wherein said lens is a telecentric lens disposed with its focal point approximately at the center of scan of the facets which reflect light into said range.

14. Scanning apparatus according to claim 13 wherein said lens is a flat field achromat which produces linear scans in said planes.

15. Scanning apparatus according to claim 8 further comprising an achromat flat field telecentric lens having its focus at the location of said virtual aperture stop.

16. Scanning apparatus according to claim 15 for use in reading bar codes on an object in said range and further comprising means responsive to electrical output signals from said detector for generating signals corresponding to said bar codes.

17. A hand held bar code scanner which comprises a board, a multifaceted optical polygon, a scan motor mounted on said board, said scan motor rotatably mounting said polygon on one side of said board, a block mounted on said one side of said board, a lamp in said block focused on a reflecting facet of said polygon, a lens also mounted on said one side of said board along a path for light reflected from said reflecting facets for projecting said light toward a bar code to be read, a beam splitter in said block, a fold mirror on the side of said board opposite to said one side, a photodetector on said opposite side of said board, said beam splitter and fold mirror defining an optical path for light from said bar code reflected from said reflecting facets to said detector, and means on said board connected to said detector for generating signals corresponding to said bar code.

18. The bar code scanner according to claim 17 wherein the facets of said optical polygon comprise mirrors of different radii of curvature attached thereto.

19. The bar code scanner according to claim 18 wherein said lens is a telecentric lens mounted on said block.

20. The invention according to claim 19 wherein said block has a hole therein containing an incandescent bulb which provides said lamp.

21. An optical code indicia scanning apparatus which transmits light into a field of view and receives light reflected or scattered from the code indicia in said field of view at a photo detector for conversion into electrical signals, the improvement comprising an entrance for said reflected light into a path to said photo detector, an aperture stop in said path, a relay lens ahead of said aperture stop to provide a virtual image of said aperture stop adjacent to said entrance whereby to equalize the intensity of illumination incident upon said detector which is reflected or scattered from the code indicia.

22. The invention according to claim 21 further comprising a field stop between said aperture stop and said detector.

23. The invention as set forth in claim 22 wherein said scanning apparatus includes a multifaceted rotatable reflector, and said stops are slits aligned parallel with the axis of rotation of said reflector.

* * * * *